United States Patent [19]

Barkan

[11] Patent Number: 5,280,164
[45] Date of Patent: * Jan. 18, 1994

[54] LASER DIODE SCANNER WITH MINIMIZED DEAD ZONE

[75] Inventor: Edward Barkan, South Setauket, N.Y.

[73] Assignee: Symbol Technologies, Inc., Bohemia, N.Y.

[*] Notice: The portion of the term of this patent subsequent to Sep. 22, 2009 has been disclaimed.

[21] Appl. No.: 809,235

[22] Filed: Dec. 17, 1991

Related U.S. Application Data

[60] Continuation of Ser. No. 574,274, Aug. 28, 1990, abandoned, which is a division of Ser. No. 265,143, Oct. 31, 1988, abandoned.

[51] Int. Cl.$^5$ .............................................. G06K 7/10
[52] U.S. Cl. .................................... 235/467; 235/472
[58] Field of Search ............... 235/454, 462, 467, 472; 359/197, 223, 225, 226, 213

[56] References Cited

U.S. PATENT DOCUMENTS 5,015,833  5/1991  Shepard et al. ..................... 235/472
5,140,144  8/1992  Shepard et al. ..................... 235/472

Primary Examiner—Samuel A. Turner
Assistant Examiner—Edward Sikorski

[57] ABSTRACT

A laser scanning system for reading bar code symbols in which the "dead zone" is minimized by appropriate positioning and size of the optical components. The vertical height (non-scan direction) of the collecting mirror is minimized, while the horizontal width (scan direction) is increased proportionally, thereby collecting less specular reflected light. The optical components are mounted on a single printed circuit board so that the optical paths are angularly offset for minimizing the specular component, while maintaining an optically-aligned relationship. The printed circuit board may be mounted in hand held laser scanning head having a single exit window.

38 Claims, 6 Drawing Sheets

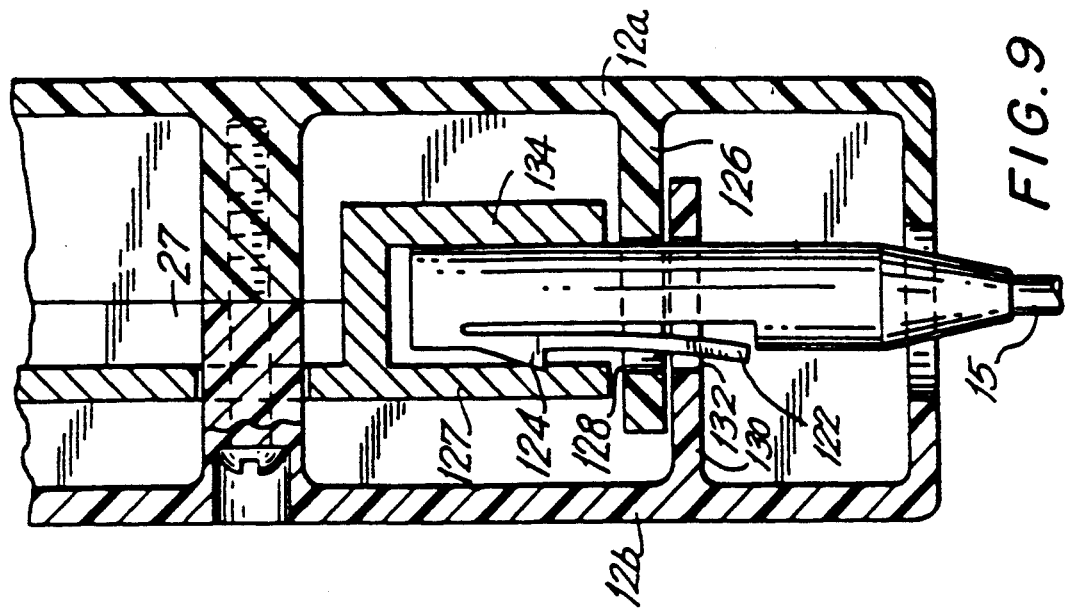
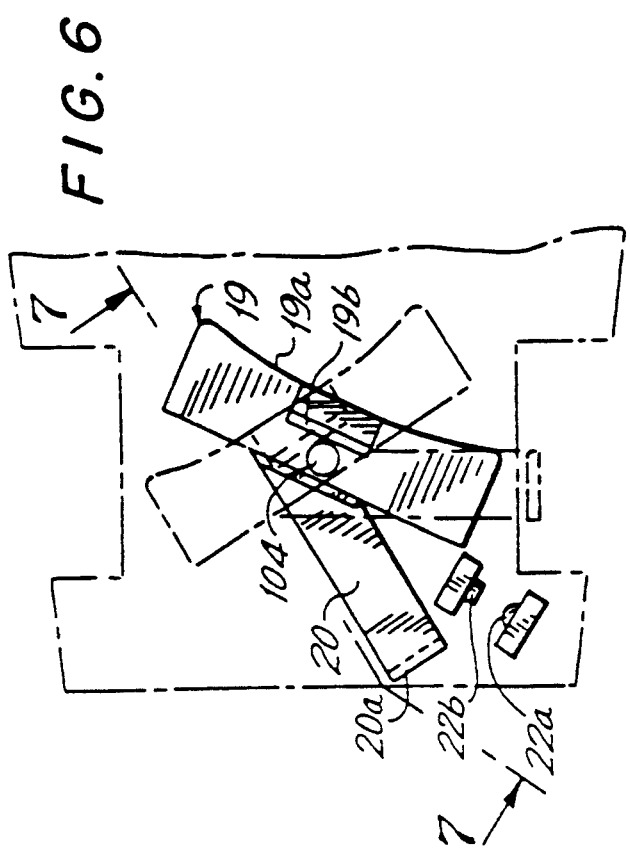
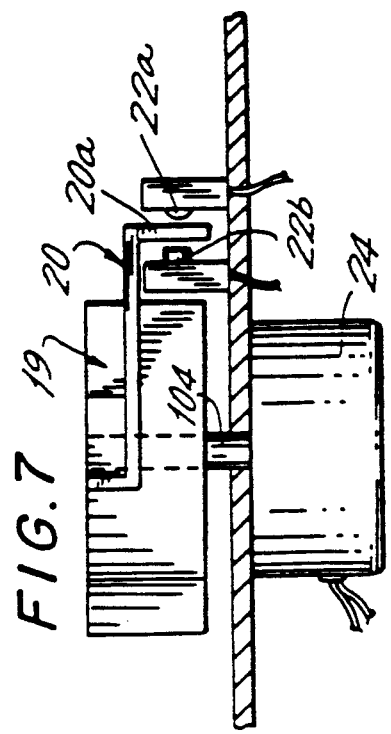

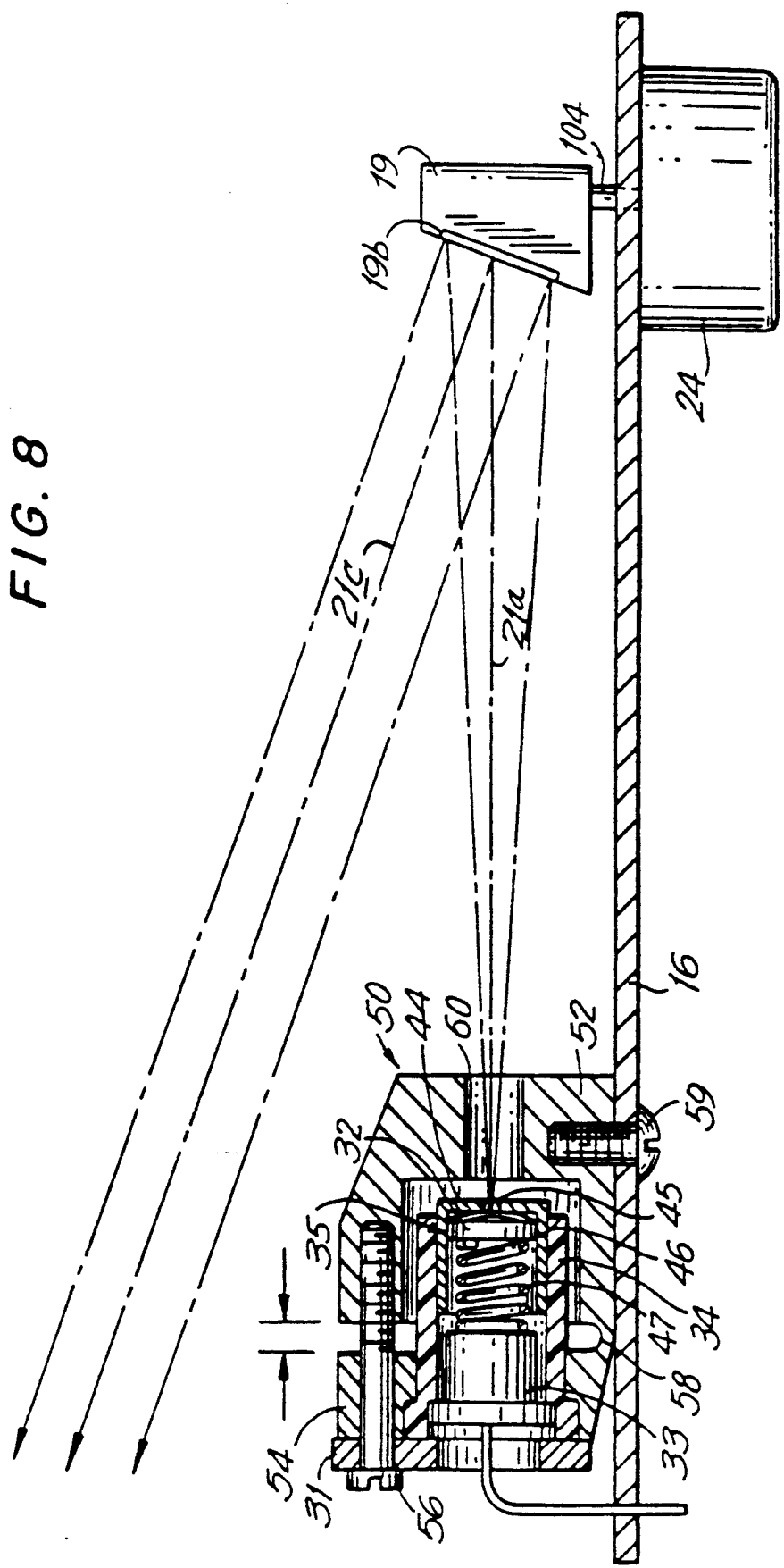

LASER DIODE SCANNER WITH MINIMIZED DEAD ZONE

This application is a continuation of U.S. patent application Ser. No. 07/574,274, filed Aug. 28, 1990, now abandoned, which in turn is a division of U.S. patent application Ser. No. 265,143, filed Oct. 31, 1988, now abandoned.

REFERENCE TO RELATED APPLICATIONS

This application is related to U.S. patent application Ser. No. 265,548, filed Oct. 31, 1988, now U.S. Pat. No. 4,896,026; U.S. patent application No. 484,170, filed Feb. 23, 1990, now U.S. Pat. No. 5,015,833; U.S. patent application Ser. No. 667,674, filed Mar. 11, 1991, now U.S. Pat. No. 5,140,144; and U.S. patent application Ser. No. 683,507, filed Apr. 8, 1991, now U.S. Pat. No. 5,157,248; and U.S. patent application Ser. No. 264,693, filed Oct. 31, 1988, all of such applications being assigned to Symbol Technologies, Inc.

BACKGROUND OF THE INVENTION

Field of the Invention

This invention generally relates to laser scanning systems for reading indicia having portions of different light reflectivity such as bar code symbols and, more particularly, to a lightweight, multi-component, portable laser diode scanning head supportable by a user and aimable at each symbol to be read. Still more particularly, this invention relates to deactuating at least one of the components, e.g. the laser diode, during part of each scan of the symbol; minimizing the dead zone within the field of view of a detector in the head, in which dead zone specular reflection may prevent a successful decode and reading of the symbol; and resisting separation of parts of the head unless an electrical cable connecting the head to the remainder of the system is first removed.

Description of Related Art

Various optical readers and optical scanning systems have been developed heretofore to optically read bar code symbols printed on labels affixed to objects in order to identify the object by optically reading the symbol thereon. The bar code symbol itself is a coded pattern comprised of a series of bars of various widths, and spaced apart from one another to bound spaces of various widths, said bars and spaces having different light-reflecting characteristics. Such readers and systems electro-optically decoded the coded patterns to a multiple alpha-numerical digit representation descriptive of the object. Scanning systems of this general type, and components for use in such systems, have been disclosed, for example, in U.S. Pat. Nos. 4,251,798; 4,360,798; 4,369,361; 4,387,297; 4,593,186; 4,496,831; 4,409,470; 4,460,120; 4,607,156; 4,673,805; 4,736,095; 4,758,717; 4,816,660; 4,816,661; 4,806,742; 4,835,374; 4,845,350; and 4,871,904; 4,760,248, as well as in U.S. patent application Ser. Nos. 7,775; and 193,265; all of which have been assigned to the same assignee as the instant application and are incorporated herein to show the state of the art.

As disclosed in some of the above patents and applications, a particularly advantageous embodiment of such a scanning system resided, inter alia, in optically modifying and directing a laser light beam from a hand-held head which was supported by a user; aiming the head and, in some cases, the laser beam itself at a symbol to be read; repetitively scanning the laser beam and/or the field of view of a detector across the symbol; detecting the laser light reflected off the symbol during scanning; and decoding the detected reflected light.

The laser beam is optically modified and focused to form a beam spot having a minimum beam cross-section or waist at a reference plane. A symbol can be read at either side of the reference plane. For ease of description, a symbol located between the reference plane and the head is defined as a "close-in" symbol, whereas a symbol that is located on the other side of the reference plane away from the head is defined as a "far-out" symbol. The term "close-in" symbol is also intended to cover the situation where the symbol actually is contacted by the head, or where the reference plane is located immediately outside the head. The range between minimum and maximum distances at which the system can read a symbol is often defined as the "depth of field". The depth of field is, of course, different for symbols of different densities.

A problem associated with known laser scanning systems involves the so-called dead zone or area within the field of view of the scanner in which specular reflection may prevent a successful decoding and reading of the symbol. When a light beam impinges on a surface, such as a symbol on a label, the reflected light has a specular component and a scattered component. The scattered component radiates in all directions, and its intensity is proportional to the contrast between the darker bars and the lighter spaces of the symbol. It is the scattered component of the reflected light which is detected and processed by the system to decode and read the symbol.

The specular component, on the other hand, is a mirror-like reflection wherein the light is reflected according to the principle that the angle of reflection is equal to the angle of incidence. The specular component is the major constituent of the reflected light, but is not that constituent which is used by the system to decode and read the symbol, because the intensity of the specular component is more dependent on surface finish as opposed to the contrast between the darker bars and the lighter spaces of the symbol. The specular component, also called glare, is typically too bright, particularly when a symbol is printed on a label having a glossy finish or overlaid with cellophane or film packaging, and can overload and "blind" the detector.

When the system includes a hand-held head having a handle which is held by a user, and is pointed at a symbol, the untrained user expects the head to work best when the laser beam exiting an exit window on the head is aimed at a right angle to the plane in which the symbol lies. The user tends to hold the handle approximately parallel to that plane. However, this is the very position where the dead zone is centered and has its maximum effect, light striking the symbol at an incidence angle of 90° will return at a reflection angle of 90°, thereby blinding the detector.

It would be desirable to minimize the dead zone and enable even the untrained operator to manipulate the hand-held head in an expected manner without causing the system to fail to read due to specular reflection.

Yet another problem associated with known laser scanning systems, particularly the field-portable type powered by an on-board battery, resides in minimizing power consumption and premature draining of the battery. In systems of the type exemplified by U.S. Pat. No.

4,251,798, the gas laser was left on all the time, not only during scanning, but also between scans. In later systems of the type exemplified by U.S. Pat. Nos. 4,387,297 and 4,409,470, the laser was shut off between scans to save power.

Although the later systems did consume less power, the power drain was still undesirably high, particularly when visible laser diodes are used. The diode is the largest consumer of electrical current of all the components in the head. Operating the diode, except when absolutely necessary to scan the symbol, decreases not only the battery life, but also decreases the working lifetime of the diode itself.

The diode is also the greatest source of waste heat in the head, and the working lifetime of the diode also is decreased by being exposed to its own heat. By operating the diode only when necessary, the diode will generate less heat, thereby enabling the head to run cooler than heretofore, enabling the head to be used in hotter ambient environments than heretofore, and enabling the diode to last longer in the field.

Yet an additional drawback involves safety, wherein it is desired to prevent one from separating different housing parts of the head without first being certain that all power to the head is first disconnected.

SUMMARY OF THE INVENTION

Objects of the Invention

It is a general object of this invention to overcome the aforementioned problems and drawbacks of known prior art laser scanning systems.

Another object of this invention is to deactuate at least one component, particularly the laser diode, during part of each scan.

Yet another object of this invention is to minimize power consumption inside the head.

Still another object of this invention is to minimize the build-up of heat inside the head.

A further object of this invention is to increase the working lifetime of a battery used for powering the components in the head.

Yet a further object of this invention is to increase the working lifetime of the laser diode.

A still further object of this invention is to enable the head to be used in warmer ambient environments than previously.

Another object of this invention is to minimize the size and effects of the dead zone.

Yet another object of this invention is to enable a user to use the head in an expected manner and orientation without causing specular reflection to prevent a successful decode and reading of the symbol.

A further object of this invention is to resist separation of parts of the head unless an electrical cable connecting the head to the remainder of the system is first removed.

Still another object of this invention is to provide a hand-held laser diode scanning head which is light-weight, compact, rugged, non-wrist-and-arm fatiguing, and capable of emitting a laser beam visible to the human eye, whereby the visible laser beam can be readily positioned on and across close-in and far-out symbols.

Another object of this invention is to provide a laser diode scanning head capable of reading not only symbols in contact with the head, but also close-in and far-out symbols.

Features of the Invention

In keeping with these objects, and others which will become apparent hereinafter, one feature of this invention resides, briefly stated, in a laser scanning system for reading indicia having portions of different light reflectivity, e.g. a bar code symbol having alternating darker bars separated by lighter spaces of variable widths. The system includes a housing, and a light source means therein for generating an incident laser beam. Advantageously, the light source means comprises a semiconductor laser diode which emits laser light at a wavelength of about 670 to about 680 nm so that the emitted laser light is at least marginally visible to the human eye.

Optic means are also provided in the housing, and are operative for optically forming and directing the incident laser beam along an optical path toward the symbol located within a range of working distances relative to the housing. Laser light is reflected off the symbol. At least a returning portion of the reflected light travels away from the symbol back toward the housing.

Scanning means, e.g. a scanning motor, having a reciprocally-oscillatable output shaft on which a reflecting surface such as a scanning mirror is mounted, are mounted in the head for scanning the symbol in a scan, and preferably at a plurality of sweeps per second across the symbol in a repetitive manner. The returning portion of the reflected laser light has a variable light intensity across the symbol during the scan which is due, in the case of a bar code symbol, to the different light-reflective characteristics of the bars and spaces which constitute the symbol.

The system also comprises sensor means, e.g. one or more photodiodes, for detecting the variable light intensity of the returning portion of the reflected laser light over a field of view, and for generating an electrical signal, typically an analog signal, indicative of the detected variable light intensity.

Signal processing means are provided for processing the analog electrical signal, and usually for processing the same to a digitized electrical signal which can be decoded to data descriptive of the symbol being scanned.

The scanning means is operative for scanning either the incident laser beam itself across the symbol, or the field of view of the sensor means, or both.

Decode/control electronic circuitry is sometimes, but not always, provided on-board the housing, but may also be located remotely therefrom. Such circuitry is operative for decoding the digitized signal to the aforementioned data, for determining a successful decoding of the symbol, and for terminating the reading of the symbol upon the determination of the successful decoding thereof. The reading is initiated by actuation of an actuator, typically a manually-actuatable trigger means provided on the housing, and operatively connected to, and operative for actuating, the light source means, the scanning means, the sensor means, the signal processing means, and the decode/control means. The trigger means is actuated once for each symbol, each symbol in its respective turn.

In a hand-held application, the housing, also called a laser scanning head, is supported by a user in his or her hand, is aimed at each symbol to be read and, once the symbol is located, the user actuates the trigger means to initiate the reading. The decode/control means automatically alerts the user when the symbol has been read so that the user can turn his or her attention to the next symbol, and repeat the reading procedure.

One feature of this invention resides in minimizing power consumption in the head, particularly by the laser diode which, as noted above, represents the largest consumer of electrical current and the largest generator of waste heat in the head. By way of comparison, the laser diode, in one preferred embodiment, uses about 90 ma, while the rest of the components in the scanner use about 25 ma, when all the components in the head are actuated. This invention proposes means for deactuating at least one of the light source means, scanning means, sensor means and the signal processing means during each scan when either said incident laser beam and/or said field of view is outside the scan field within which the symbol is located. By contrast with prior art designs, where the laser source was either kept on all the time or shut off between scans, this aspect of the invention turns the laser off at least once during each scan, and specifically in the overscan portions of the scan field. By way of example, if it is assumed that the symbol has a length of about 2¼", then the scan line which sweeps the symbol measures generally on the order of 3", thereby leaving ⅜" overscan regions at either end of the symbol. Since the symbol is not being read while the laser beam is traversing each of said overscan regions, there is no need to keep the laser diode on while the laser beam is traversing these overscan regions.

It will further be appreciated that the linear spot speed during each scan is not a linear function. In each overscan end region, the beam spot speed is slower, as compared to the beam spot speed across the symbol. It has been estimated that the laser beam spends about 20% of its time during each scan in each overscan end region. Therefore, in terms of time and duty cycle, the laser beam is only spending 60% of its time in useful activity scanning the symbol.

The deactuating means advantageously interrupts the supply of current to the laser diode and shuts it off each time the laser beam enters an overscan region. The deactuating means includes means for sensing opposite end limits of the scan field, and means for generating a deactivation electrical signal for each such sensed end limit.

By turning the laser diode on only when it is absolutely necessary, i.e. when the laser beam is traversing the symbol, electrical energy consumption in the head is significantly minimized. When a rechargeable battery is used to power the components in the head, the working lifetime of the battery is correspondingly increased. By maintaining the diode off during part of each scan, less heat is generated within the head. Since the total number of hours of useful life of the laser diode is at least partly temperature-dependent, the reduction of heat in the head further increases the working life-time of the diode.

Still another feature of this invention is embodied in reducing the size of the so-called dead zone within the field of view of the scanner in which specular reflection may prevent a successful decoding and reading of the symbol. As previously explained, the untrained user tends to orient the hand-held head in the very position where the dead zone is centered and has its maximum deleterious effect. This invention proposes directing the incident laser beam to travel at an acute angle relative to a generally planar upper wall of the head as the incident laser beam passes through an exit port on the head en route to the symbol. Hence, even if the untrained user points the head so that its barrel is pointed at a right angle to the symbol being read, the effects of specular reflection are minimized because the incident laser beam itself has been deliberately offset relative to the elongation of the barrel. In one preferred embodiment, the outgoing laser beam travels at an acute angle of approximately 3° relative to the horizontal.

Still another way of minimizing the specular component includes means for mounting a collecting mirror at a rear end region of the elongated barrel of the head. The further back the collecting mirror is relative to the symbol, the less change exists of collecting reflected specular light. Furthermore, it is advantageous if the collecting mirror is configured to have a height dimension, as considered along a direction generally normal to the scan direction, to be about one-half its width dimension, as considered along the scan direction. By making the vertical height of the collecting mirror as small as possible, again the chances of collecting specular light are reduced.

Still another method of minimizing the dead zone, of particular benefit when the head is used to read symbols in contact therewith, is to slope a front end region or nose of the housing at an acute angle relative to the generally planar upper wall of the housing. Since the nose is sloped rearwardly toward a bottom planar wall of the head, this will further reinforce the movement of the beam away from the vertical, as the operator will tend to hold the nose parallel to the plane in which the symbol lies, especially when the scanner is used in contact with the symbol.

An additional feature of this invention resides in a safety interlock for resisting separation of two parts of the head unless an electrical cable, which is connected to the head, is first removed therefrom. The cable typically carries power to the head and, as a safety precaution, it is best that the head not be capable of being disassembled when power is being supplied thereto. The interlock includes a pair of aligned channels, one on each housing part. The cable is provided with an elongated pin connector which extends through the aligned channels during system operation, and which affirmatively prevents the housing parts from being separated unless the pin is removed from the aligned channels. Previously, such safety precautions were attempted to be realized by an electrical switch provided on the housing. However, a negligent or ignorant user may not have actuated the safety switch, thereby compromising user safety.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIG. 6 is a top plan view of part of the optical assembly of FIG. 3;

FIG. 7 is a side view of the optical assembly of FIG. 6;

FIG. 8 is an enlarged sectional view of the optical assembly of FIG. 3; and

FIG. 9 is an enlarged sectional view taken on line 9—9 of FIG. 2.

DETAILED DESCRIPTION OF THE PREFERRED EMBODIMENTS

Figure 1:
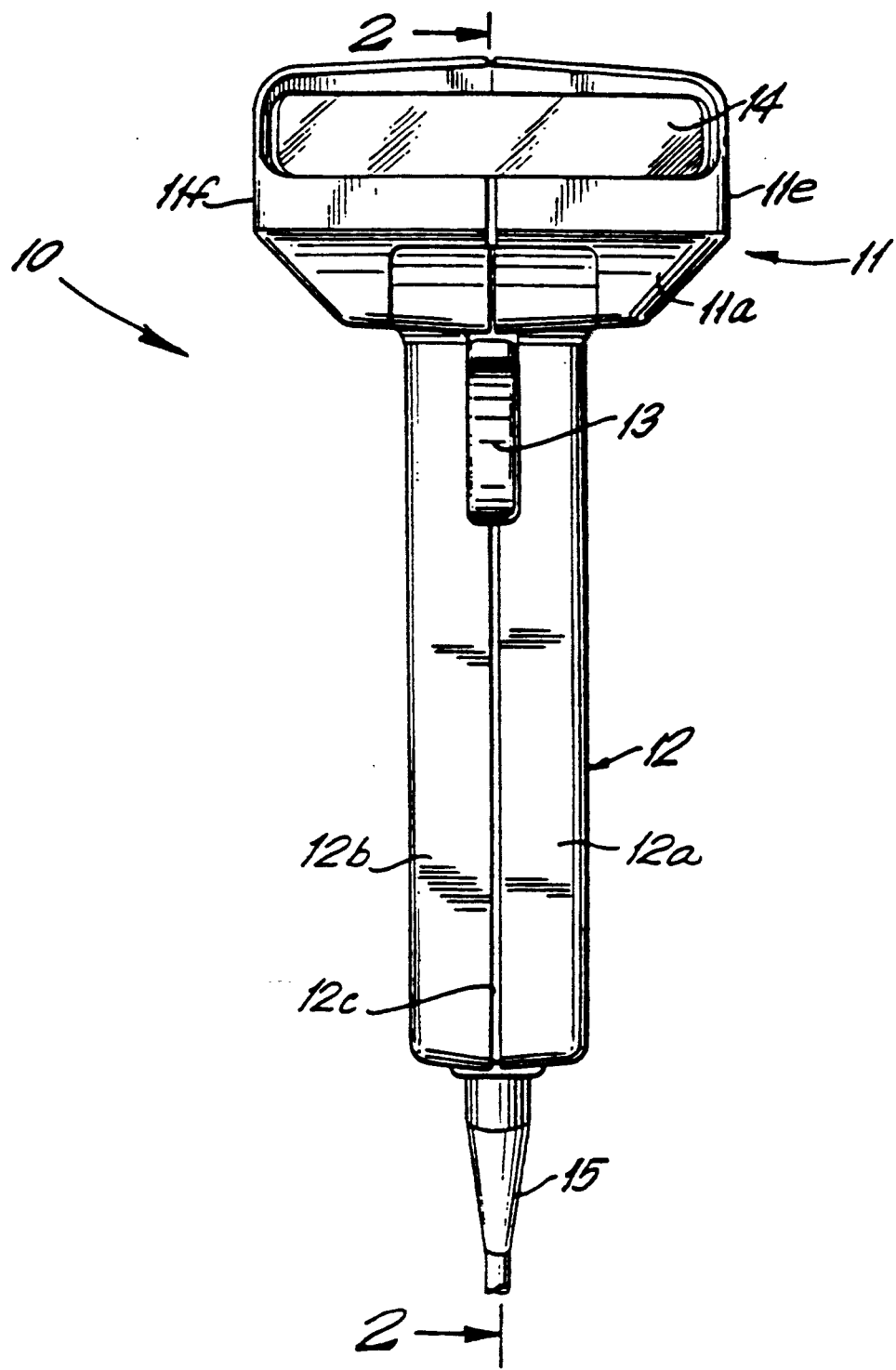
FIG. 1 is a front view of a laser scanning head according to this invention.

Referring now to FIGS. 1-4 of the drawings, reference numeral 10 generally identifies a lightweight (less than one pound), streamlined, hand-held, fully-portable, easy-to-manipulate, non-arm-and-wrist fatiguing laser scanning head supportable entirely by a user for use in a laser scanning system operative for reading, scanning and/or analyzing symbols, and aimable both prior to, and during, the reading thereof, by the user at the symbols, each symbol in its turn. The term "symbol", as used herein, is intended to cover indicia composed of different portions having different light-reflective properties at the wavelength of the light source, e.g. a laser, being utilized. The indicia may be the omnipresent Universal Product Code (UPC) symbol, or any of the black and white industrial symbols, e.g. Code 39, Codabar, Interleaved 2 of 5, etc.. The indicia may also be any alphabetic and/or numeric characters. The term "symbol" is also intended to cover indicia located in a background field, wherein the indicia, or at least a portion thereof, have a different light-reflectivity property than that for the background field. In this latter definition, the "reading" of the symbol is of particular benefit in the fields of robotics and object recognition.

Turning now to FIG. 1, the head 10 includes a generally gun-shaped housing having a handle portion 12 of generally rectangular cross-section and generally elongated along a handle axis, and a generally horizontally-elongated barrel or body portion 11. The cross-sectional dimension and overall size of the handle portion 12 is such that the head 10 conveniently can fit and be held in a user's hand. The body and handle portions are constituted of a lightweight, resilient, shock-resistant, self-supporting material, such as a synthetic plastic material. The plastic housing preferably is injection-molded, but can be vacuum-formed or blow-molded to form a thin, hollow shell which bounds an interior space whose volume measures less than a value on the order of 50 cubic inches and, in some applications, the volume is on the order of 25 cubic inches or less. Such specific values are not intended to be self-limiting, but to provide a general approximation of the overall maximum size and volume of the head 10. The shell is formed of two housing parts 12a, 12b meeting along a generally vertical joining line 12c.

Figure 4:
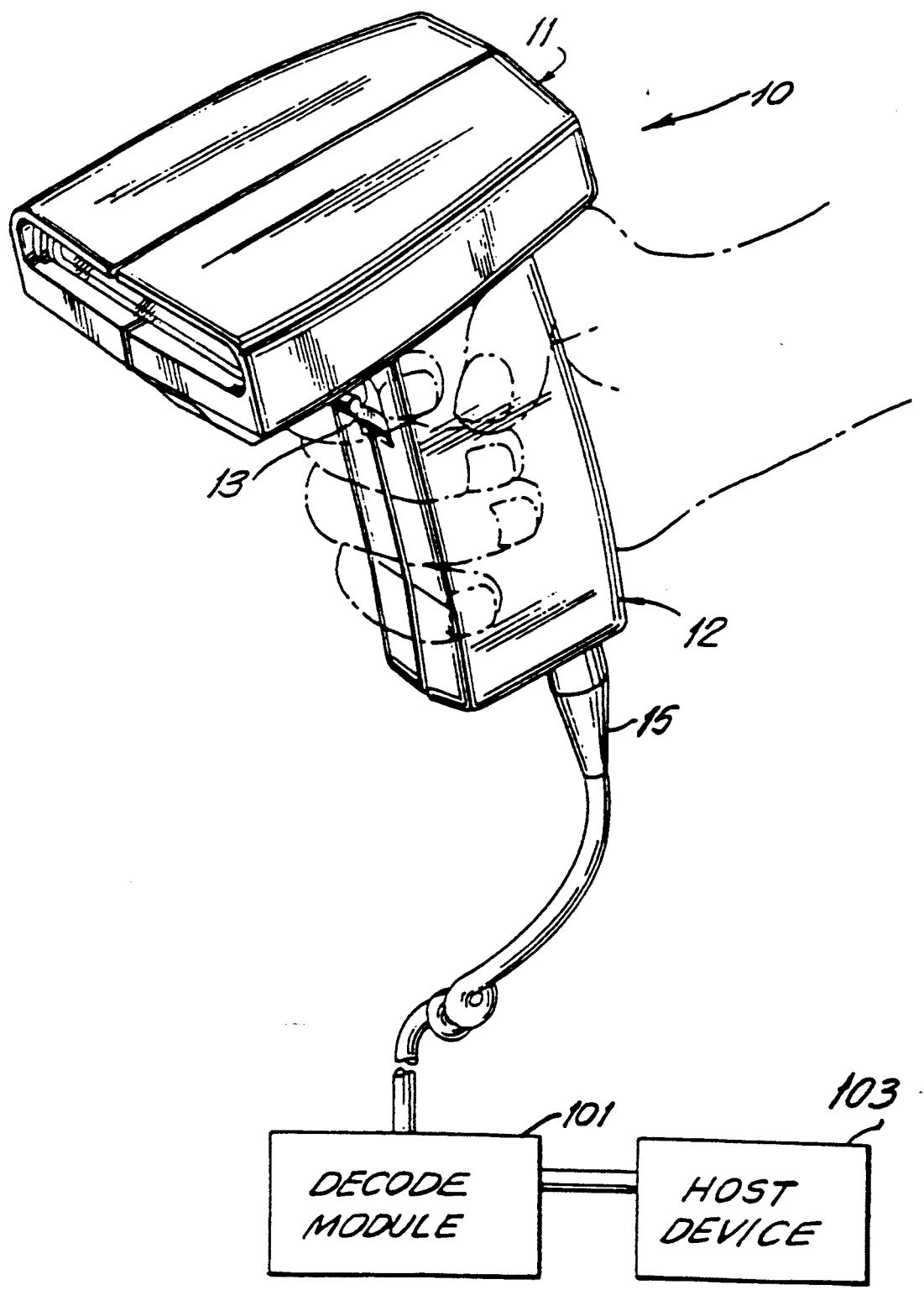
FIG. 4 is a front perspective view of the head of FIG. 1 in use, and schematically connected to other components of a laser scanning system.

As considered in an intended position of use as shown in FIG. 4, the body portion 11 has a front prow region or nose having an inclined front wall 11a. The body portion 11 also has a rear region or stern having a rear wall 11b spaced rearwardly of the inclined front wall 11a. The body portion 11 also has a top wall 11c, a bottom wall 11d below the top wall 11c, and a pair of opposed side walls 11e, 11f between the top and bottom walls. The front wall 11a is sloped relative to the top and bottom walls.

A manually-actuatable, and preferably depressible, trigger 13 is mounted on a cantilever resilient arm 13a for movement relative to the head in a forwardly-facing region where the handle and body portions meet and where the user's forefinger normally lies when the user grips the handle portion in the intended position of use. The bottom wall 11d has a lower opening, and the handle 12 has a forwardly-facing slot through which the trigger 13 projects and is moved. The arm 13a has one end overlying a trigger switch 25 which is switched from an open to a closed state upon depression of the trigger 13.

A window 14 is stationarily mounted at the nose and is light-transmissive to allow laser light to pass from the interior to the exterior of the head, and vice versa.

A flexible, non-bulky, coil-type electrical cable 15 with multiple freedoms of movement interconnects the head 10 to the remainder of the components of the laser scanning system, whose operation is explained in greater detail below.

A plurality of components are mounted in the head and, as explained below, at least some of them are actuated by the trigger 13, either directly or indirectly, by means of a control microprocessor. One of the head components is an actuatable laser light source (see FIGS. 3 and 4), e.g. a semiconductor laser diode 33, operative, when actuated by the trigger 13, for propagating and generating an incident laser beam whose light is at least marginally visible to the human eye. The wavelength of the emitted beam is in the range from about 670 nm to about 680 nm. The emitted laser diode beam is highly divergent; diverges differently in different planes parallel and perpendicular to the longitudinal direction of beam propagation; is non-radially symmetrical, i.e. anamorphic; and has a beam cross-section resembling an oval. The diode may be of the continuous wave or pulse type. The diode requires a low voltage (e.g. 12 v DC or less) supplied by a power regulator and a battery (DC) source which may be provided within the head, or by a re-chargeable battery pack accessory detachably mounted on the head, or by a power conductor in the cable 15 connected to the head from an external power supply (e.g. DC source).

As best shown in FIG. 8, an optical assembly 30 is mounted in the head on a thin, flexible, printed circuit board 16 and adjustably positioned relative to the same for optically modifying and directing the emitted laser beam along a first optical path 21a, 21c toward a reference plane which is located exteriorly of the head, either at the nose for reading symbols in contact with the front wall 11a, or forwardly of the nose for reading symbols out of contact with the front wall 11a. The reference plane lies generally perpendicular to the longitudinal direction along which the emitted laser beam propagates. A symbol to be read is located in the vicinity of the reference plane, either at, or at one side, or at an opposite side, of the reference plane; that is, anywhere within the depth of field of the optically modified laser beam and within a range of working distances as measured relative to the head. The laser beam reflects off the symbol as a specular component in one direction and as a scattered component in many directions, and that portion of the scattered laser light which travels along a second optical path 21c and 21b away from the symbol back toward the head is known herein as the returning portion which, of course, also is at least marginally visible to the user.

As best shown in FIG. 8, the optical assembly includes an elongated, cylindrical optical tube 34 having at one end region a cylindrical bore in which an annular casing portion of the diode 33 is snugly received to hold the diode in a fixed position, and at the opposite end region of the optical tube 34 a lens barrel 35 is mounted for longitudinal movement. The lens barrel 35 includes an aperture stop 45, blocking wall portions 44 surrounding and bounding the aperture stop, and cylindrical side wall portions 46 which bound an interior space.

The optical assembly further includes a focusing lens 32, e.g. a plano-convex lens, located within the interior space of the side wall portions 46 in the first optical path, and operative (with the stop) for focusing the emitted laser beam at the reference plane. The aperture stop 45 may be located on either side of the lens 32, but preferably on the downstream side. A biasing means or tensioned coil spring 47 is located within the optical tube, and has one coil end bearing against a casing portion of the diode, and another coil end bearing against a planar side of the lens 32. The spring constantly urges the lens against the blocking wall portions, thereby fixedly locating the lens relative to the aperture stop. The lens and aperture stop are jointly moved when the lens barrel is longitudinally moved. The side wall portions are initially received in a threaded or sliding relationship with an inner circumferential wall bounding the optical tube, and are thereupon fixed, e.g. by glueing or clamping, to the inner circumferential wall when a desired longitudinal spacing between the lens and the aperture stop on the one hand, and the diode on the other hand, has been obtained. The longitudinal movement between the side wall portions and the inner circumferential wall of the tube constitutes an adjustable positioning means for the lens and the aperture stop, and the fixing in position of the lens and the aperture stop relative to the diode constitutes a means for fixedly locating the lens and the aperture stop at a predetermined spacing from the diode.

The aperture stop has a cross-section which is, as explained below, about equal to the cross-section of the emitted laser beam at the aperture stop, thereby permitting a major portion of the emitted laser beam to pass through the aperture stop downstream along the first optical path en route to the symbol. The aperture stop cross-section preferably is rectangular or oval, in which case, the longer dimension of the rectangular or oval cross-section is aligned with the larger divergence angle of the laser beam to transmit more energy to the symbol.

The optical assembly includes an optical block 50 having a front portion 52 and a rear portion 54 together bounding an interior in which the diode 33, optical tube 34, lens barrel 35 and the aforementioned components contained therein are received. A heat sink 31 is mounted in intimate thermal contact with the diode to conduct heat away from the same. An elevation adjustment means, including at least one threaded element 56, passes with clearance through aligned holes formed respectively in the heat sink and the rear portion 54, and is threaded into a threaded bore formed in the front portion 52. A hinge 58 is advantageously realized by providing a thin, flexible, weakened zone in the optical block between the front and rear portions thereof. The front portion 52 is stationarily mounted on the board 16 by anchors 59. The diode, tube, barrel and the components contained therein are mounted on the rear portion for movement therewith. Upon turning the element 56 in either circumferential direction about an axis along which the element 56 extends, the rear portion and all the components supported thereon will be angularly moved about the hinge 58 relative to the stationary front portion, thereby raising or lowering the emitted light beam which exits the block 50 through a clearance passage 60 which is dimensioned so as not to block the beam throughout its angular range of adjustment.

Figure 5:
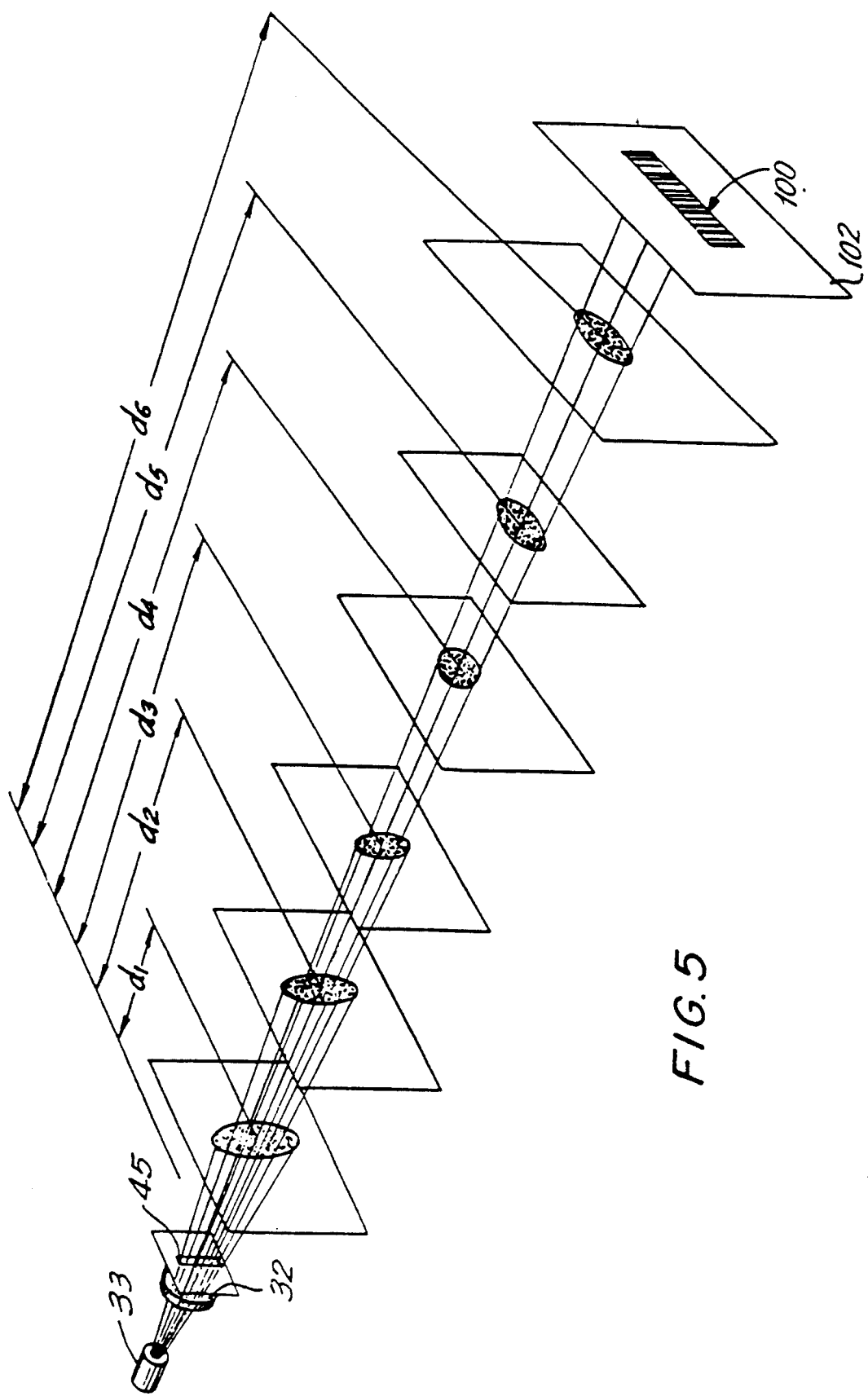
FIG. 5 is a perspective view depicting various cross-sections of the laser beam emitted by the head of FIG. 1.

The laser beam that passes through the passage 60 is directed rearwardly by the optical assembly along path 21a within the head to a generally planar scanning mirror 19b for reflection therefrom. The scanning mirror 19b forwardly reflects the laser beam impinging thereon along path 21c through the forwardly-facing, laser-light-transmissive window 14 and to the symbol. As best shown in FIG. 5, a representative symbol 100 in the vicinity of the reference plane 102 is shown and, in the case of a bar code symbol, is comprised of a series of vertical bars spaced apart of one another along a longitudinal direction. A laser beam spot is focused on the symbol. When the scanning mirror is, as explained below, reciprocally and repetitively oscillated transversely to sweep the laser beam lengthwise across all the bars of the symbol, a linear scan is generated. The linear scan can be located anywhere along the height of the bars provided that all the bars are swept. The length of the linear scan is longer than the length of the longest symbol expected to be read and, in a preferred case, the linear scan is on the order of 3 inches at the reference plane.

The scanning mirror 19b is mounted on a scanning means, preferably a high-speed scanner motor 24 of the type shown and described in U.S. Pat. No. 4,387,397, the entire contents of said patent being incorporated herein by reference and made part of the instant application. For the purposes of this application, it is believed to be sufficient to point out that the scanner motor 24 has an output shaft 104 on which a support bracket 19 is fixedly mounted. The scanning mirror is fixedly mounted on the bracket. The motor is driven to reciprocally and repetitively oscillate the shaft in alternate circumferential directions over arc lengths of any desired size, typically less than 360°, and at a rate of speed on the order of a plurality of oscillations per second. In a preferred embodiment, the scanning mirror and the shaft jointly are oscillated so that the scanning mirror repetitively sweeps the laser diode beam impinging thereon through an angular distance or arc length at the reference plane of about 32° and at a rate of about 20 scans or 40 oscillations per second.

Referring again to FIG. 3, the returning portion of the scattered component of the reflected laser light has a variable light intensity, due to the different light-reflective properties of the various parts that comprise the symbol 100, over the symbol during the scan. The returning portion of the reflected laser light is collected by a generally concave, spherical collecting mirror 19a, and is a broad conical stream of light in a conical collecting volume centered on path 21c. The collecting mirror 19a reflects the collected conical light into the head along path 21b through a laser-light-transmissive element 106 to a sensor means, e.g. a photosensor 17. The photosensor 17, preferably a photodiode, detects the variable intensity of the collected laser light over a field of view which extends along, and preferably beyond, the linear scan, and generates an electrical analog signal indicative of the detected variable light intensity.

The photosensor "sees" a collection zone on the symbol. The aforementioned angular adjustment means ensures that the emitted laser beam impinges on the symbol at the collection zone when the laser spot impinges on the symbol.

The collecting mirror 19a is also mounted on the support bracket 19 and, when the scanning mirror is actuated by the trigger, the collecting mirror is reciprocally and repetitively oscillated transversely, sweeping the field of view of the photodiode lengthwise across the symbol in a linear scan.

The scanning mirror and the collecting mirror are, in a preferred embodiment, of one-piece construction, but the scanning mirror can also be a discrete, small, planar mirror attached by glue, or molded in place, at the correct position and angle on a discrete, front surfaced, silvered concave mirror. The concave collecting mirror serves to collect the returning portion of the laser light and to focus the same on the photodiode.

Also mounted in the head are various electrical subcircuits mounted on board 16. For example, signal processing means 38 on board 16 are operative for processing the analog electrical signal generated by the sensor, and for generating a digitized video signal. Data descriptive of the symbol can be derived from the video signal. Suitable signal processing means for this purpose was described in U.S. Pat. No. 4,251,798. Component 39 on board 16 constitutes drive circuitry for the scanner motor, and suitable motor drive circuitry for this purpose was described in U.S. Pat. No. 4,387,297. Component 40 on board 16 is a voltage converter for converting the incoming voltage to one suitable for energizing the laser diode 33. The entire contents of U.S. Pat. Nos. 4,251,798 and 4,387,297 are incorporated herein by reference and made part of the instant application.

The digitized video signal is conducted, in one embodiment, along cable 15 to decode/control means 101 (see FIG. 4) operative for decoding the digitized video signal to a digitized decoded signal from which the desired data descriptive of the symbol is obtained, in accordance with an algorithm contained in a software control program. The decode/control means includes a PROM for holding the control program, a RAM for temporary data storage, and a control microprocessor for controlling the PROM and RAM. The decode/control means determines when a successful decoding of the symbol has been obtained, and also terminates the reading of the symbol upon the determination of the successful decoding thereof. The initiation of the reading is caused by depression of the trigger. The decode/control means also includes control circuitry for controlling the actuation of the actuatable components in the head, as initiated by the trigger, as well as for communicating with the user that the reading has been automatically terminated as, for example, by sending control signals to indicator lamps 36, 37 to illuminate the same.

The decoded signal is conducted to a remote, host computer 103 which serves essentially as a large data base, stores the decoded signal and, in some cases, provides information related to the decoded signal. For example, the host computer can provide retail price information corresponding to the objects identified by their decoded symbols.

In another embodiment, the decode/control means and a local data storage means are mounted on another printed circuit board 27 in the handle portion, and store multiple decoded signals which have been read. The stored decoded signals thereupon can be unloaded to a remote host computer. By providing the local data storage means, the use of the cable during the reading of the symbols can be eliminated—a feature which is very desirable in making the head as freely manipulatable as possible. A beeper 28 is also operationally mounted on board 27 so that the user can hear through a port 29 in the handle when a symbol has been successfully read.

Minimizing the dead zone, in which specular reflection may cause a symbol not to be successfully read, is achieved in several ways. First, the vertical height (non-scan direction) of the collecting mirror 19a is decreased and made as small as practicable. By minimizing this mirror height, the chances are less for collecting specular reflected light. At the same time, the horizontal width (scan direction) of the collecting mirror 19a is increased proportionately to the decrease in the height thereof so that the total collection area presented by the collecting mirror remains approximately the same. In a preferred case, the collecting mirror measures 9 mm by 25 mm, while the scanning mirror measures 6 mm by 6 mm. The collecting mirror can thus be characterized as being "short and wide" compared to the collecting mirror of U.S. Pat. No. 4,760,248 which, by contrast, is "tall and narrow".

Second, the further back the collecting mirror 19a is from the symbol, again, the chances are less for specular reflected light to be collected. Thus, collecting mirror 19a is situated adjacent the rear wall 11b of the head, and well back of the front wall 11a.

Figure 2:
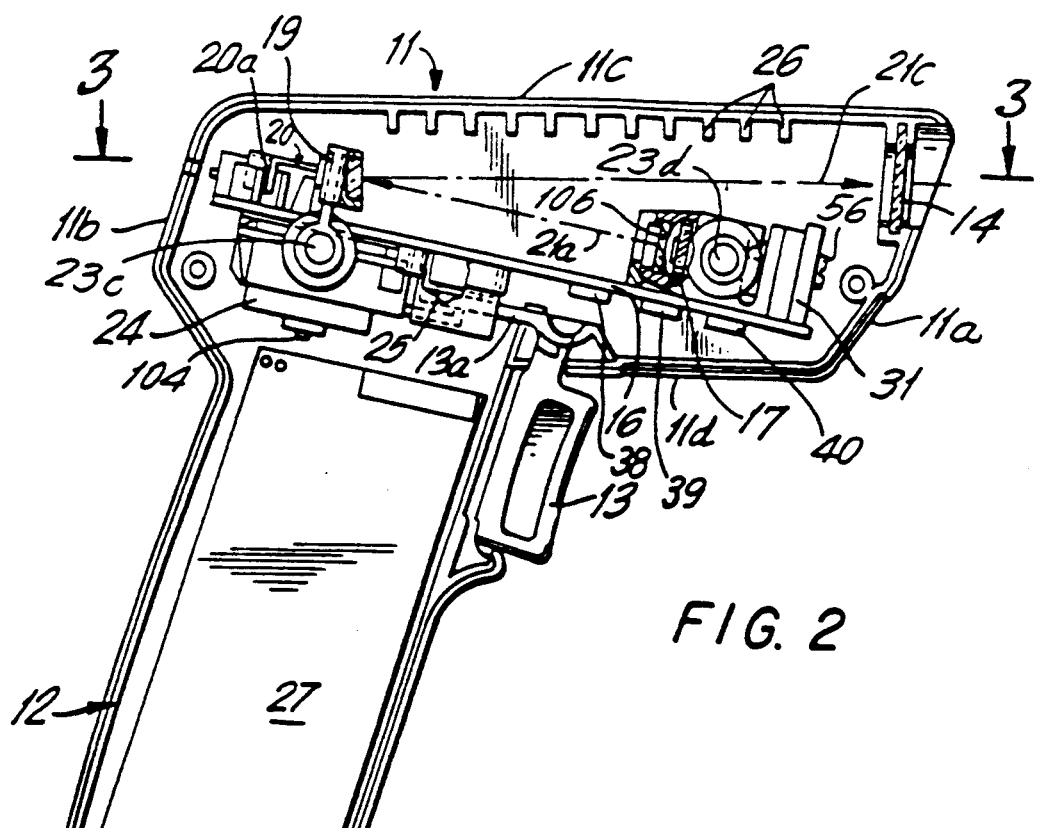
FIG. 2 is a vertical sectional view taken on line 2—2 of FIG. 1.
Figure 3:
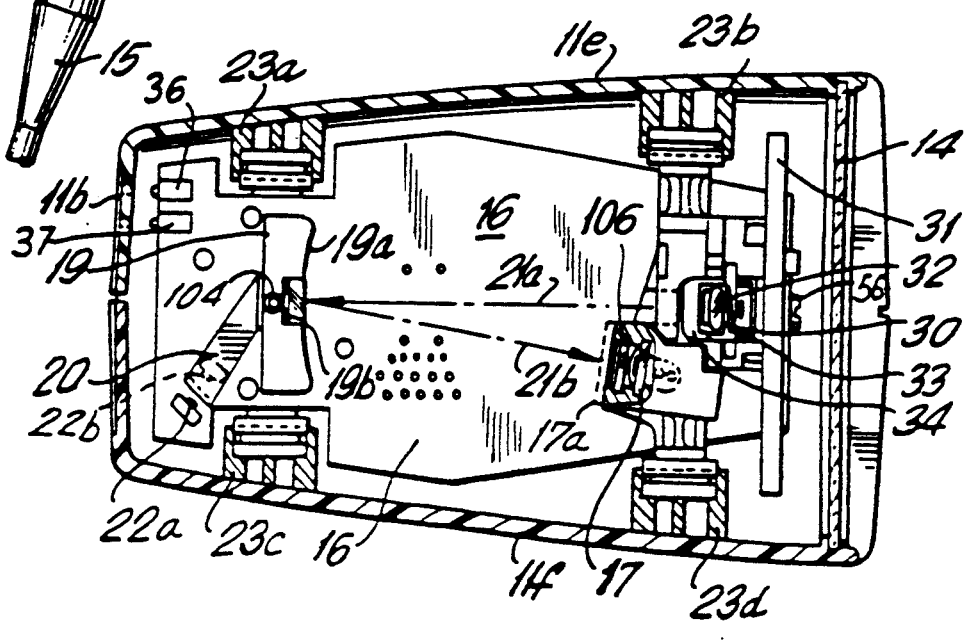
FIG. 3 is a plan sectional view taken on line 3—3 of FIG. 2.

Third, the optic means and scanning means inside the head are so positioned that the optical path 21c is inclined at a slight acute angle on the order of 3° relative to the horizontal. Thus, as shown in FIG. 2, when the user holds the head so that the upper planar wall 11c lies in a horizontal plane, the outgoing laser beam is directed at an upward slope of about 3° relative to the plane of the upper wall 11c. Hence, even when the head is held in the FIG. 2 position, the emitted laser beam will not be incident on the symbol at an angle of incidence of 90°.

Fourth, the inclined front wall 11a, which forms an acute angle relative to the bottom wall 11d, motivates the user to hold the barrel 11 at other than a right angle relative to the reference plane, and particularly so when the inclined front wall 11a is placed in contact with a symbol.

Power minimization by deactuating at least one of the components, particularly the laser diode, during a part of each scan is advantageously achieved by detecting when either the emitted laser beam and/or the field of view of the detector is outside the scan field in which the symbol is located. As best shown in FIGS. 2 and 7, an L-shaped arm 20 is fixed on, and extends rearwardly of, the bracket 19 for joint oscillating movement about the axis of shaft 104. The arm 20 terminates in a shutter 20a which is moved into and out of a light path between a light emitting diode 22a and a light receiver 22b.

As shown in FIG. 6, when the shutter is in a blocking position in which it interrupts the light emitted by the diode 22a, the receiver 22b senses the absence of light and, in turn, the laser diode 33 is turned on. When the shutter is in a non-blocking position in which it is remote from the light path, the receiver 22b receives the light emitted by diode 22a and, in turn, the laser diode 33 is turned off. In a preferred embodiment, the laser diode 33 is turned off by deactivating the voltage regulator 39 which supplies a regulated voltage to the diode 33.

Hence, the laser diode 33 is turned on when the laser beam and/or the field of view is scanning on the symbol, and is turned off when the laser beam and/or the field of view is scanning past the symbol at each end thereof. If the scan field or length of the symbol is on the order of 2¼" at the reference plane, and if the scan is about 3" at the reference plane, then the length of each overscan end region at either end of the symbol is about ⅜" and, as detailed above, there is no reason to have the laser diode on in each overscan region.

The laser scanning head of FIG. 2 is of the retro-reflective type wherein the outgoing incident laser beam, as well as the field of view of the sensor means, are scanned. It will be readily understood that other variants also are within the spirit of this invention. For example, the outgoing incident laser beam can be directed to, and swept across, the symbol through one window on the head, while the field of view is not scanned and the returning laser light is collected through another window on the head. Also, the outgoing incident beam can be directed to, but not swept across, the symbol, while the field of view is scanned.

Turning now to FIG. 9, cable 15 terminates in a connector or pin 120 having a resilient metallic catch 122 formed with a barb 124. Housing part 12a has a web 126 formed with a clearance hole 128; and housing part 12b has a web 130 formed with a clearance hole 132 aligned with hole 128 when the parts are assembled. The pin 120 is inserted through the aligned holes 128, 132 and is electro-mechanically connected to a mating connector socket 134. During insertion, the barb 124 is pushed aside to clear the holes and, once cleared, the barb 124 lockingly engages a conductor 127 on the circuit board 27.

Once fully inserted, the pin 120 affirmatively prevents the housing parts from being disassembled unless the pin 120 is first removed. Removal of the pin is achieved by first turning the pin 120 about its axis and then withdrawing the pin from the aligned holes.

The head herein need not be hand-held, but can be incorporated in a desk-top, stand-alone workstation in which the symbol is passed underneath an overhead window or port through which the outgoing beam is directed. Although the workstation itself is stationary during scanning, the symbol is movable relative to the workstation and must be registered with the outgoing beam and, for this purpose, the enhanced visibility laser beam described herein is advantageous. Also, the head may further include deactivation apparatus for changing the state of a surveillance device associated with a tag or label on which the symbol is provided, such as described in U.S. Ser. No. 236,249, assigned to the assignee of the instant application.

It will be understood that each of the elements described above, or two or more together, also may find a useful application in other types of constructions differing from the types described above.

While the invention has been illustrated and described as embodied in a laser diode scanner with minimized power consumption, minimized dead zone and increased safety, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a scanning system for reading indicia having portions of different light reflectivity, said system including
   (A) a hand-held housing normally supported by a user and having an elongated housing portion having a generally planar upper wall and a generally planar exit port, said housing portion having a front end region closer to, and a rear end region further from, the indicia during an intended position of use;
   (B) means in the housing for generating an incident light beam;
   (C) optic means in the housing for optically forming and transmitting the incident light beam along an optical path through the exit port toward indicia located in the optical path, thereby reflecting off the indicia reflected light having a specular component and a scattered component, at least a returning portion of the reflected light traveling away from the indicia along a travel path back toward the housing;
   (D) reciprocally oscillatable scanning means in the housing for scanning the indicia in a scan across the indicia, said returning portion of the reflected light having a variable intensity over the scan;
   (E) a scanning mirror reciprocally oscillatable by the scanning means and located in the optical path between the optic means and the exit port;
   (F) sensor means in the housing for detecting the variable intensity of the returning portion of the reflected light over a field of view, and for generating an electrical analog signal indicative of the detected variable light intensity, said scanning means being operative for scanning at least one of said incident light beam and said field of view;
   (G) a collecting mirror reciprocally oscillated by the scanning means and located in the travel path of said returning portion of the reflected light between the exit port and the sensor means; and
   (H) signal processing means for processing he analog electrical signal, and for generating a proposed signal indicative of the indicia,
   the improvement which comprises:
   a generally planar printed circuit board mounted within the elongated housing portion and extending in a forward direction from the rear end region to the front end region at a downwardly falling slope, said beam generating means, said optic means and said sensor means being mounted on the board at a predetermined elevation with respect to a reference point on the housing at the front end region, and said scanning means and the mirrors being mounted on the board at the rear end region at a higher elevation with respect to said reference point than said predetermined elevation; and
   means for minimizing the specular component of the returning portion of the reflected light when an indicium to be read lies in a plane which is generally normal to the elongated housing portion, said minimizing means including means for positioning the scanning mirror to direct the incident beam to travel at an acute angle relative to the generally planar upper wall of the housing portion and above the beam generating means, the optic means and the sensor means at an upwardly rising slope along said forward direction as the incident beam passes through the exit port en route to the indicium.

2. The improved system as recited in claim 1, wherein the acute angle measures about 3° relative to the horizontal of the plane of the planar upper wall of the housing portion.

3. The improved system as recited in claim 1, wherein the scanning mirror is mounted on the collecting mirror for joint oscillation a plurality of times per second to repetitively and cyclically scan each indicia.

4. The improved system as recited in claim 1, wherein the collecting mirror has a height dimension, as considered along a direction generally normal to the scan direction, to be about one-half its width dimension, as considered along the scan direction.

5. The improved system as recited in claim 1, wherein the front end region includes a front wall sloped at an acute angle relative to the generally planar exit port of the housing.

6. In a scanning system for reading indicia having portions of different light reflectivity, said system including (A) a hand-held housing normally supported by a user and having an elongated housing portion having a generally planar upper wall and a generally planar exit port, a first end region closer to, and a rear end region further from, the indicia during an intended position of use;

(B) means in the housing for generating an incident light beam;

(C) optic means in the housing for optically forming and transmitting the incident light beam along an optical path through the exit port toward indicia located in the optical path, thereby reflecting off the indicia reflected light having a specular component and a scattered component, at least a returning portion of the reflected light traveling away from the indicia along a travel path back toward the housing;

(D) reciprocally oscillatable scanning means in the hosing for scanning the indicia in a scan across the indicia, said returning portion of the reflected light having a variable intensity over the scan;

(E) a scanning mirror reciprocally oscillatable by the scanning means and located in the optical path between the optic means and the exit port;

(F) sensor means in the housing for detecting the variable intensity of the returning portion of the reflected light over a field of view, and for generating an electrical analog signal indicative of the detected variable light intensity, said scanning means being operative for scanning at least one of said incident light beam and said field of view;

(G) a collecting mirror reciprocally oscillated by the scanning means and located in the travel path of said returning portion of the reflected light between the exit port and the sensor means; and (H) signal processing means for processing he analog electrical signal, and for generating a proposed signal indicative of the indicia, the improvement which comprises:

a generally planar printed circuit board mounted within the elongated housing portion and extending in a forward direction from the rear end region to the front end region at a downwardly falling slope, said beam generating means, said optic means and said sensor means being mounted on the board at a predetermined elevation with respect to a reference point on the housing at the front end region, and said scanning means and the mirrors being mounted on the board at the rear end region at a higher elevation with respect to said reference point than said predetermined elevation; and means for minimizing the specular component of the returning portion of the reflected light when an indicium to be read lies in a plane which is generally normal to the elongated housing portion, said minimizing means including means for positioning the scanning mirror to direct the incident beam to travel at an acute angle relative to the generally planar upper wall of the housing portion and above the beam generating means, the optic means and the sensor means at an upwardly rising slope along said forward direction as the incident beam passes through the exit port en route to the indicium, and means for configuring the collecting mirror to have a height dimension, as considered along a direction generally normal to the scan direction, to be not more than one-half its width dimension, as considered along the scan direction.

7. The improved system as recited in claim 6, wherein the front end region of the housing portion has a front wall sloped at an acute angle relative to the generally planar exit port of the housing portion.

8. In a scanning system for reading indicia having portions of different light reflectivity, said system including (A) a hand-held housing normally supported by a user and having a generally planar exit port and an elongated housing portion having a front end region closer to, and a rear end region further from, the indicia during an intended position of use;

(B) means in the housing for generating an incident light beam;

(C) optic means in the housing for optically forming and transmitting the incident beam along an optical path through the exit port toward indicia located in the optical path, thereby reflecting off the indicia reflected light having a specular component and a scattered component, at least a returning portion of the reflected light traveling away from the indicia in a travel path back toward the housing;

(D) reciprocally oscillatable scanning means in the hosing for scanning the indicia in a scan across the indicia, said returning portion of the reflected light having a variable intensity over the scan;

(E) sensor means in the housing for detecting the variable intensity of the returning portion of the reflected light over a fiend of view, and for generating an electrical analog signal indicative of the detected variable light intensity, said scanning means being operative for scanning at least one of said incident beam and said field of view;

(F) a collecting mirror reciprocally oscillated by the scanning means and located in the travel path of said returning portion of the reflected light between the exit port and the sensor means; and (G) signal processing means for processing the analog electrical signal, and for generating a processed signal indicative of the indicia, the improvement which comprises:

a generally planar printed circuit board mounted within the elongated housing portion and extending in a forward direction from the rear end region to the front end region at a downwardly falling slope, said beam generating means, said optic means and said sensor means being mounted on the board at a predetermined elevation with respect to a reference point on the housing at the front end region, and said scanning means and the mirrors being mounted on the board at the rear end region at a higher elevation with respect to said reference point than said predetermined elevation; and means for minimizing the specular component of the returning portion of the reflected light when an indicium to be read lies in a plane which is generally normal to the elongated housing portion, said minimizing means including means for mounting the collecting mirror at the rear end region of the housing portion, and means for configuring the collecting mirror to have a height dimension, as considered along a direction generally normal to the scan direction, to be not more than one-half its width dimension, as considered along the scan direction.

9. The improved system as recited in claim 8, further comprising a scanning mirror jointly oscillatable with the collecting mirror, said scanning mirror being located in the optical path between the exit port and the optic means.

10. The improved system as recited in claim 9, wherein the housing portion has a generally planar upper wall, and wherein the minimizing means positions the scanning mirror to direct the incident beam to travel at an acute angle relative to the generally planar upper wall of the housing portion and above the beam generating means, the optic means and the sensor means at an upwardly rising slope along said forward direction as the incident beam passes through the exit port en route to the indicium.

11. The improved system as recited in claim 10, wherein the front end region of the housing portion has a front wall sloped at an acute angle relative to the generally planar exit port of the housing portion.

12. A scan module for use in light scanning systems for reading indicia having portions of different light reflectivity and for minimizing the collection of specular reflections, comprising:

(a) a generally planar printed circuit board having first and second end regions spaced longitudinally apart of each other;

(b) light source means at a first end region for generating a light beam which is directed toward the second end region along a first optical path;

(c) mirror assembly at the second end region in the first optical path, said mirror assembly including a reflecting surface inclined relative to the board for reflecting said light beam in a direction toward the first end region along a second optical path above said light source means, and along a third optical path to the indicia for reflection therefrom, said second optical path being angularly offset from the first optical path as considered in a vertical plane generally normal to the board;

(d) sensor means disposed at the first end region, for receiving light reflected from the indicia; and (e) said mirror assembly at the second end region in the second optical path including a collecting mirror having a collecting surface for collecting the reflected light from the indicia traveling along the second optical path and passing above the sensor means, and for directing the collected reflected light to the sensor means along a fourth optical path that is angularly offset from the first optical path as considered in a horizontal plane generally parallel to the board.

13. The scan module as recited in claim 12, wherein the specular component of the returning portion of the reflected light is minimized by the positioning of said second mirror assembly with respect to the second and third optical paths.

14. The scan module as recited in claim 12, wherein said third optical path is a linear extension of said second optical path.

15. A scan module for use in light scanning systems for reading indicia having portions of different light reflectivity and located at a distance from the scan module so that light is reflected therefrom with scattered and specular components of such light being returned in the general direction of the scan module, comprising:

(a) a generally planar, printed circuit board having first and second end regions spaced longitudinally apart of each other;

(b) light source means on the board for generating a light beam toward the first end region along a first optical path;

(c) a first mirror disposed at the first end region in the first optical path, said mirror having a reflecting surface for reflecting the light beam toward the second end region along a second optical path, said second optical path being angularly offset from the first optical path as considered in a vertical plane generally normal to the board;

(d) scanning means for directing the light beam in a scanning pattern across the indicia for reflection therefrom;

(e) sensor means on the board for receiving light reflected from the indicia; and (f) a second mirror disposed at the first end region and being in the second optical path, said second mirror functioning to collect the reflected light from the indicia traveling along the second optical path and to direct the collected reflected light to the sensor means along a third optical path that is angularly offset from the first optical path as considered in a horizontal plane generally parallel to the board.

16. The scan module as recited in claim 15, wherein the specular component of the returning portion of the reflected light is minimized by the positioning of said second mirror with respect to the second optical path.

17. The scan module as recited in claim 16, wherein the board has a centerline extending from said first to said second end region, and wherein the first mirror is centrally mounted on the board along the centerline.

18. The scan module as recited in claim 15, wherein the scanning means is disposed at the first end region.

19. The scan module as recited in claim 15, wherein the board has a centerline extending from said first to said second end region, and wherein the scanning means is centrally mounted on the board along the centerline.

20. The scan module as recited in claim 15, wherein the board has a centerline extending from said first to said second end region, and wherein the sensor means is mounted on the board away from the centerline.

21. The scan module as recited in claim 15, wherein the light source means includes a laser diode and an optical assembly mounted on the board and arranged in an optically-aligned relationship along the first optical path.

22. The scan module as recited in claim 15, wherein the first mirror at the first end region is a movable mirror.

23. The scan module as recited in claim 15, wherein the second mirror at the first end region is a movable mirror.

24. The scan module as recited in claim 15, wherein the reflecting surface of aid first mirror is generally planar.

25. The scan module as recited in claim 15, wherein the surface of the second mirror is generally concave.

26. The scan module as recited in claim 15, wherein said first mirror and said second mirror are fixedly mounted together.

27. The scan module as recited in claim 15, wherein the first mirror is a reflecting surface mirror and the second mirror is a collecting mirror, and said first and second mirrors are mounted for joint oscillating movement about an axis that extends generally normally of the board.

28. The scan module as recited in claim 15, wherein the board is a thin, flexible substrate.

29. The scan module as recited in claim 15, wherein the scanning means includes a drive motor mounted at one of the end regions of the board.

30. The scan module as recited in claim 29, wherein the drive motor is mounted on a side of the printed circuit board opposite of that of said light source means and sensor means.

31. The scan module as recited in claim 29, wherein the scanning means includes a drive shaft coupling the drive motor to said first mirror to move said first mirror to reflect the light beam from the first optical path to produce a scanning light beam along said second optical path.

32. The scan module as recited in claim 15, wherein the second mirror includes a collecting mirror having a height, as considered along a direction generally normal to the scan direction, less than one-half its width, as considered along the scan direction, said collecting mirror being operative for collecting at least a portion of the light reflected from the indicia and being more likely only to collect diffuse reflections from the target.

33. A scan module for use in light scanning systems for reading indicia having portions of different light reflectivity and located at a distance from the scan module, comprising a generally planar printed circuit board having circuit components of the module thereon, a concavely curved mirror having a smaller planar surface thereon mounted at one end portion of the printed circuit board so that the reflective surfaces thereof form an obtuse angle with the plane of the board, a light source including a laser diode mounted at the opposite end of the board to direct a laser light beam therefrom against said planar mirror surface to be reflected therefrom along an optical path diverging from the plane of said board, means for causing the beam reflected from said planar mirror surface to move in a scanning patterns across indicia to be read, and a sensor positioned at the same end portion of said board as said light source to receive light collected by said curved, concave mirror from the indicia being scanned.

34. A scan module for use in light scanning systems for reading indicia having portions of different light reflectivity and located at a distance from the scan module, comprising a generally planar printed circuit board having a light source and a planar first mirror mounted thereon in spaced relationship to each other and positioned so that a beam from the light source will be directed against the planar first mirror and reflected therefrom along an optical path diverging from the plane of the circuit board, scanning means for causing said beam to be moved in a scanning pattern across indicia to be read and a concavely curved second mirror mounted on said board to collect light reflected from the indicia being scanned and in turn reflect the same into a sensor mounted on the board in an area adjacent said light source, wherein said planar first mirror is fixedly mounted on said second mirror.

35. Scan module according to claim 34, in which said light source includes a laser diode.

36. A scan module for use in light scanning systems for reading indicia having portions of different light reflectivity and located at a distance from the scan module, comprising:
(a) a generally planar printed circuit board having first and second end regions spaced longitudinally apart of each other;
(b) light source means on the board for generating a light beam toward the first end region along a first optical path;
(c) a first optical element disposed at the first end region in the first optical path, said optical element functioning to direct the light beam toward the second end region along a second optical path, said second optical path being angularly offset from the first optical path as considered in a vertical plane generally normal to the board;
(d) scanning means for moving the light beam in a scanning pattern and directing it to the indicia so as to produce a scan across the indicia, thereby reflecting light of variable light intensity off the indicia;
(e) sensor means on the board for receiving light reflected from the indicia; and
(f) a second optical element disposed at the first end region and being in the second optical path, said second optical element functioning to collect the reflected light from the indicia traveling along the second optical path and to direct the collected reflected light to the sensor means along a third optical path that is angularly offset from the first optical path as considered in a horizontal plane generally parallel to the board.

37. Scan module for use in light scanning systems for reading indicia having portions of different light reflectivity and located at a distance from the scan module, comprising a generally planar printed circuit board having a light source and a first mirror mounted thereon in spaced relationship to each other and positioned so that a beam from the light source will be directed against the first mirror and reflected therefrom along an optical path diverging from the plane of the circuit board, scanning means for causing said beam to be moved in a scanning pattern across indicia to be read and a second mirror mounted on said board to collect light reflected from the indicia being scanned and in turn reflect the same into a sensor mounted on the board in an area adjacent said light source, wherein said first and second mirrors are mounted on an end portion of said printed circuit board, and said light source and said sensor are mounted at the opposite end portion of said board.

38. A scan module for use in light scanning systems for reading indicia having portions of different light reflectivity and located at a distance from the scan module, comprising a generally planar printed circuit board having a light source and a first mirror mounted thereon in spaced relationship to each other and positioned so that a beam from the light source will be directed against the first mirror and reflected therefrom along an optical path diverging from the plane of the circuit board, scanning means for causing said beam to be moved in a scanning pattern across indicia to be read and a second mirror mounted on said board to collect light reflected from the indicia being scanned and in turn reflect the same into a sensor mounted on the board in an area adjacent said light source wherein said first mirror is a planar mirror, said second mirror is a concavely curved mirror, and said first mirror is fixedly mounted on said second mirror.

* * * * *